US009736027B2

(12) United States Patent
Vittal et al.

(10) Patent No.: US 9,736,027 B2
(45) Date of Patent: Aug. 15, 2017

(54) CENTRALIZED ENTERPRISE IMAGE UPGRADES FOR DISTRIBUTED CAMPUS NETWORKS

(71) Applicant: Cisco Technology, Inc., San Jose, CA (US)

(72) Inventors: Satheesha Vittal, Bangalore (IN); Raghavasandeep Maram, Rajam (IN); Ranjith Kumar Madalapu, Kadapa (IN)

(73) Assignee: Cisco Technology, Inc., San Jose, CA (US)

( * ) Notice: Subject to any disclaimer, the term of this patent is extended or adjusted under 35 U.S.C. 154(b) by 8 days.

(21) Appl. No.: 14/071,139

(22) Filed: Nov. 4, 2013

(65) Prior Publication Data
US 2015/0127788 A1    May 7, 2015

(51) Int. Cl.
| G06F 15/177 | (2006.01) |
| H04L 12/24 | (2006.01) |
| H04L 29/06 | (2006.01) |
| H04L 12/46 | (2006.01) |
| G06F 9/445 | (2006.01) |
| H04L 12/28 | (2006.01) |

(52) U.S. Cl.
CPC .......... *H04L 41/12* (2013.01); *G06F 8/63* (2013.01); *H04L 12/2852* (2013.01); *H04L 12/4616* (2013.01); *H04L 12/4633* (2013.01); *H04L 41/042* (2013.01); *H04L 41/0803* (2013.01); *H04L 65/1069* (2013.01)

(58) Field of Classification Search
USPC .......................................................... 709/221
See application file for complete search history.

(56) References Cited

U.S. PATENT DOCUMENTS

| 2004/0049552 A1* | 3/2004 | Motoyama | ............ H04L 43/067 709/208 |
| 2007/0274285 A1* | 11/2007 | Werber | ............... H04L 41/0806 370/351 |
| 2008/0155252 A1* | 6/2008 | Nambiar | ............. H04L 12/4633 713/153 |
| 2008/0198858 A1* | 8/2008 | Townsley | ............ H04L 12/4641 370/401 |

(Continued)

OTHER PUBLICATIONS

Cisco Systems, Inc.; "Smart Install Configuration Guide", Oct. 7, 2013, Chapter 1, <http://www.cisco.com/en/US/docs/switches/lan/smart_install/configuration/guide/concepts.html>.

(Continued)

*Primary Examiner* — Vivek Srivastava
*Assistant Examiner* — Hermon Asres
(74) *Attorney, Agent, or Firm* — Patterson + Sheridan, LLP

(57) ABSTRACT

System, method, and computer program product to perform an operation, comprising establishing a connection between a primary intermediate branch director (IBD) in a first branch of an enterprise network and a first proxy IBD in a second branch of the enterprise network, receiving, at the primary IBD, network topology information for each of a plurality of intermediate branch clients (IBCs) in the second branch of the enterprise network, and issuing, by the primary IBD to the first proxy IBD, a command to remotely configure at least one IBC of the plurality of IBCs in the second branch of the enterprise network.

24 Claims, 8 Drawing Sheets

(56) References Cited

U.S. PATENT DOCUMENTS

| | | | | |
|---|---|---|---|---|
| 2010/0088693 A1* | 4/2010 | Vulugundam | ............ | G06F 8/65 717/173 |
| 2013/0091273 A1* | 4/2013 | Ly | ........................ | H04L 41/00 709/224 |
| 2013/0290716 A1* | 10/2013 | Gavrilov | ............ | H04L 63/0272 713/168 |
| 2013/0297757 A1* | 11/2013 | Han | .................... | H04L 41/0806 709/222 |

OTHER PUBLICATIONS

Cisco Systems, Inc.; "ISSU Upgrade", Mar. 2006, <http://www.cisco.com/en/US/products/ps7149/products_ios_protocol_group_home.html>.

* cited by examiner

CENTRALIZED ENTERPRISE IMAGE UPGRADES FOR DISTRIBUTED CAMPUS NETWORKS

TECHNICAL FIELD

Embodiments presented in this disclosure generally relate to computer networking, and more specifically to upgrading distributed campus networks using a centralized enterprise image.

BACKGROUND

In many networks, controllers provide smart-install features used to install an image or to modify the configuration of a switch in a local network. For example, an intermediate branch director (IBD) may be used to install an image or modify the configuration on one or more local intermediate branch clients (IBC). However, these solutions address only single enterprise campuses (i.e., a single network), and not multiple campuses (or branches) connected by a WAN/MAN network. A variety of businesses, government, and educational institutions operate more complex network infrastructure where multiple distinct networks are connected to one another. In such circumstances, users spend significant time managing existing switches and installing new switches across different branches, as existing solutions do not provide for a single point of control for each branch of the entity's network.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DESCRIPTION

Overview

Embodiments disclosed herein provide a system, method, and computer program product to perform an operation, comprising establishing a connection between a primary intermediate branch director (IBD) in a first branch of an enterprise network and a first proxy IBD in a second branch of the enterprise network, receiving, at the primary IBD, network topology information for each of a plurality of intermediate branch clients (IBCs) in the second branch of the enterprise network, and issuing, by the primary IBD to the first proxy IBD, a command to remotely configure at least one IBC of the plurality of IBCs in the second branch of the enterprise network.

Description of Example Embodiments

Embodiments disclosed herein provide network controllers (such as edge routers of a campus in an enterprise) configured to remotely manage network elements (switches, routers, and the like) over a wide area network (WAN) or metropolitan area network (MAN), even though the controller is not on the same local network (branch or campus) as the network elements themselves. Generally, an intelligent intermediate branch director (iIBD, or intelligent IBD) from one local network is configured to establish layer 3 (L3) tunneled connections with IBDs in other sites of an enterprise. The IBDs at each sites serve as proxy IBD for the IBDs at the other sites. Doing so facilitates communication between the intelligent IBD and the intermediate branch clients (IBC) in the local network served by the respective proxy IBD. A user, or program executing on the intelligent IBD, may initiate a process to install an image on a remote IBC or modify the configuration of a remote IBC, even though the remote IBC is in a different location. Therefore, embodiments disclosed herein provide a single point of control for all campuses of an enterprise network, allowing zero-touch upgrades, on demand upgrades, and join window features across the different branches of a campus network.

As used herein, the terms "campus," "branch," and "local network," are interchangeably used to refer to a local network site, while the term "enterprise" is used to refer to two or more local network sites connected through a MAN or WAN. The use herein of Smart Install, Cisco Discovery Protocol (CDP), IBDs, and IBCs, by Cisco Systems, Inc., are for illustrative purposes only, and are not intended to be limiting of the disclosure, as embodiments of the disclosure contemplate any suitable protocol, hardware, or software.

Figure 1A:
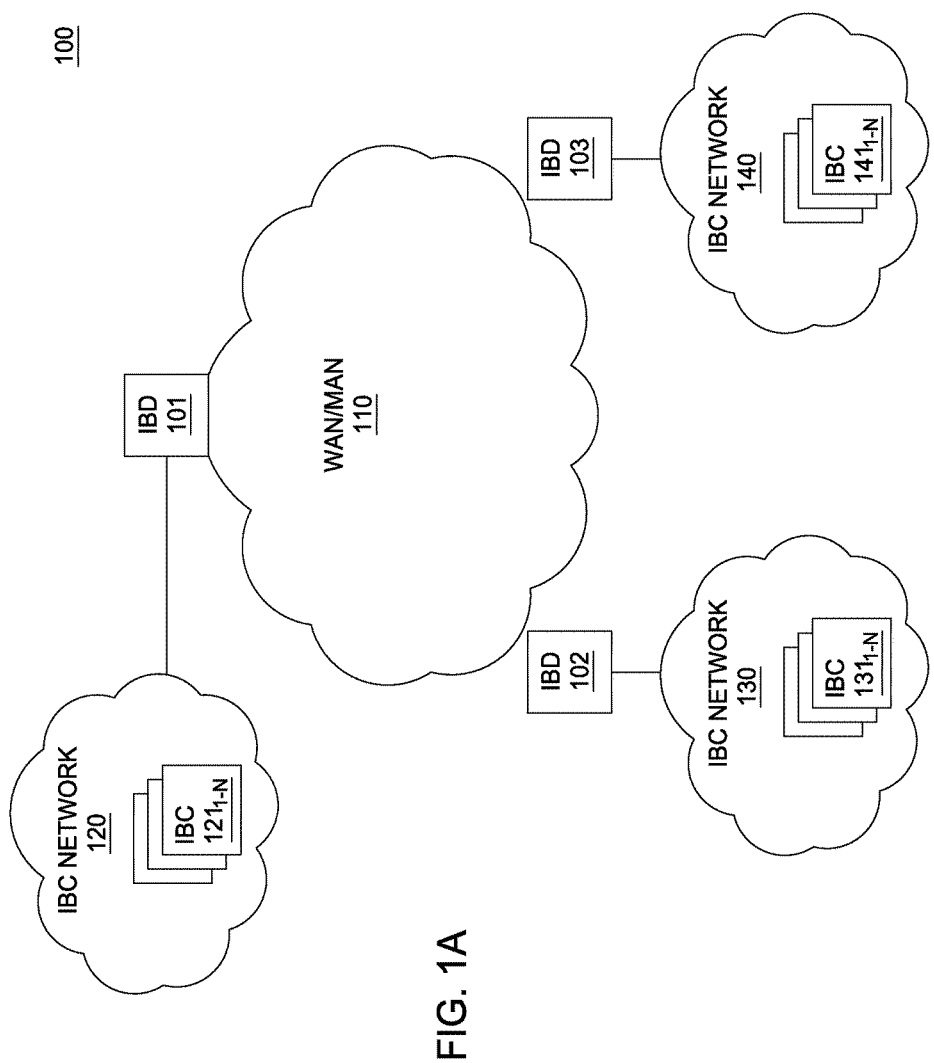
FIG. 1A illustrates distributed campus networks, according to one embodiment.

FIG. 1A is a schematic 100 illustrating distributed campus networks, according to one embodiment. As shown, three IBDs 101-103 are connected through a WAN/MAN 110. The IBDs 101-103 may be edge switches providing links to the WAN/MAN 110 for the respective IBC networks 120, 130, and 140. In one embodiment, the IBDs 101-103 can automatically configure network elements, such as the IBCs $121_{1-N}$, $131_{1-N}$, and $141_{1-N}$, that are plugged into IBC networks 120, 130, 140, without the need for user configuration. Furthermore, the IBDs 101-103 can act as a DHCP server and main store for configuration and system image files to facilitate the setup of the IBCs $121_{1-N}$, $131_{1-N}$, and $141_{1-N}$. The IBC networks 120, 130, and 140 may be different branches (or campuses) of an enterprise network managed by a single entity. As shown, each IBC network 120, 130, and 140 include a plurality of IBCs $121_{1-N}$, $131_{1-N}$, and $141_{1-N}$. In the configuration shown in FIG. 1A, a user wishing to remotely manage one of the IBCs $121_{1-N}$, $131_{1-N}$, and $141_{1-N}$ does so through the IBD 101, 102, or 103, respectively. The IBDs 101-103 cannot reach across the WAN/MAN 110 to modify or otherwise control one of the IBCs 121$_{1-N}$, 131$_{1-N}$, and 141$_{1-N}$ residing behind a different IBD 101-103.

Figure 1B:
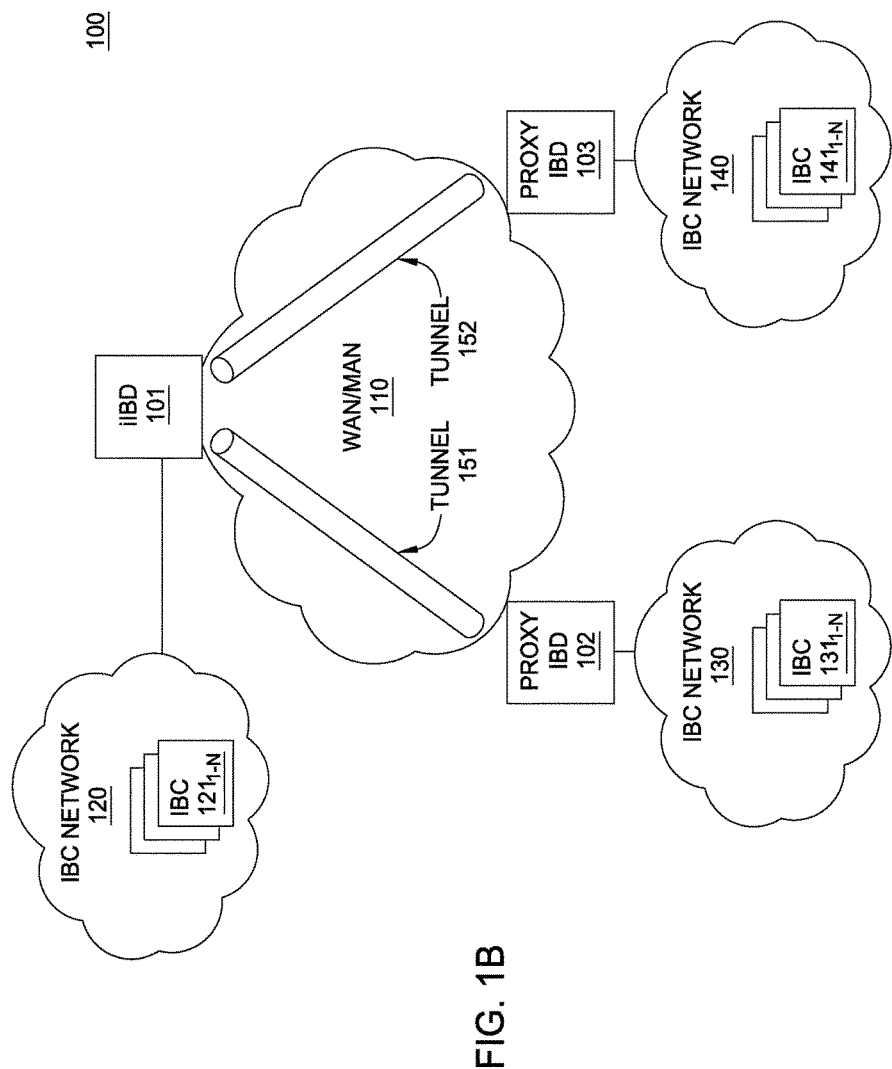
FIG. 1B illustrates techniques to enable centralized enterprise image upgrade for distributed campus networks, according to one embodiment.

FIG. 1B is a schematic 100 illustrating enabling centralized enterprise image upgrade for distributed campus networks, according to one embodiment. As shown, IBD 101 has been configured as an intelligent IBD (iIBD) 101. Generally, the iIBD 101 (also referred to as a primary IBD or coordinating IBD) is a centralized server that is configured to allow a network administrator to configure the image installs and configuration upgrades of remote switches present in the IBC networks 120, 130, 140. In configuring the iIBD 101, L3 tunnels 151 and 152 have been established to connect the iIBD 101 to proxy IBD 102 and proxy IBD 103, respectively. Proxy IBDs 102 and 103 are responsible for gathering information of the switches in the respective IBC networks 130 and 140 and for communicating the information to the iIBD. In one embodiment, the proxy IBDs 102-103 communicate with the iIBD using a generic plug and play configuration and image-management protocol understood by the iIBD and the proxy IBDs (such as an extended smart install protocol). The IBCs 121$_{1-N}$, 131$_{1-N}$, and 141$_{1-N}$ know what network elements they are connected to, and share this information with the corresponding IBD 101-103. In the case of IBCs 121$_{1-N}$, e.g., the topology information is sent to iIBD 101.

In FIG. 1B, iIBD 101 provides a central point of control for IBCs 121$_{1-N}$, 131$_{1-N}$, and 141$_{1-N}$, meaning that a user (or an application) can issue commands from iIBD 101 to manipulate any of the IBCs 121$_{1-N}$, 131$_{1-N}$, and 141$_{1-N}$. For example, a user may issue a command from iIBD 101, through L3 tunnel 151 and IBD proxy 102, that causes modifications to the configuration of a subset of IBCs 131$_{1-N}$. The user may then issue another command from iIBD 101, through L3 tunnel 152 and IBD proxy 103, that causes an image to be installed on a subset of IBCs 141$_{1-N}$.

Generally, to facilitate the techniques depicted in FIG. 1B, an IBD server is selected and configured to serve as the iIBD server. That is, an existing IBD server is designated as a coordination point for the IBC networks 120, 130, and 140. The proxy IBD servers, i.e., the IBD servers not acting as the primary coordination point may be registered with the iIBD server, and the L3 tunnel connections may be created between the proxy IBD servers and the iIBD server. The L3 tunnel connections may then be configured to support a smart install protocol, such as the C-SMI protocol by Cisco Systems, Inc. The proxy IBD servers may then share network topology information about the configuration of their respective IBC networks with the iIBD, which then compiles a centralized database including a topology of each branch of the enterprise network. Using this information, the iIBD server may then issue commands to one or more IBCs in the enterprise network to perform a variety of operations on the one or more IBCs, such as installing an image to the IBC, or modifying the configuration of the IBC.

Figure 2:
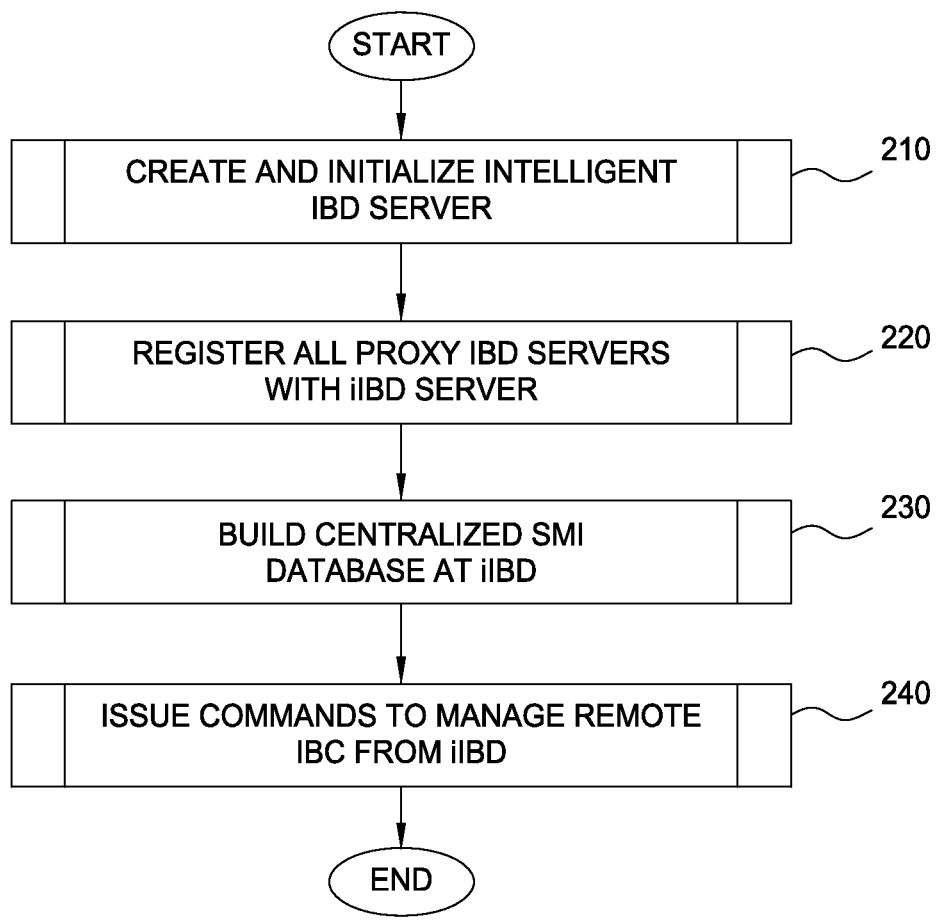
FIG. 2 illustrates a method to enable enterprise image upgrade for distributed campus networks, according to one embodiment.

FIG. 2 illustrates a method 200 to enable enterprise image upgrade for distributed campus networks, according to one embodiment. Generally, the method 200 creates a centralized controller that can control remote networking devices residing in different branches of an enterprise network. At block 210, a user may initialize an intelligent IBD (iIBD) server. Generally, to configure the iIBD server, a user may create a server socket with IBD servers that will act as proxy IBD servers, establish an L3 tunnel between the iIBD and proxy IBDs, and enable the smart install protocol on the L3 tunnel. At block 220, the proxy IBD servers register with the iIBD server. Generally, at block 220, the centralized smart install protocol automatically detects the proxy IBD present at each campus of an enterprise network, authenticates the proxy IBD with the iIBD, and establishes the L3 tunnel configurations at the iIBD and proxy IBDs.

At block 230, the iIBD builds a centralized smart install database including information for all network elements (IBCs) at each campus of the enterprise network. The database may include neighbor discovery information for each IBC gathered using at least one discovery protocol. At block 240, a user issues commands to manage one or more remote IBCs from the iIBD. For example, the user may issue a command from the iIBD which causes images to be installed on a group of IBCs on remote campuses (or local campus). As another example, the user may issue a command from the iIBD which causes configuration changes to be made on IBCs on remote campuses (or local campus).

Figure 3:
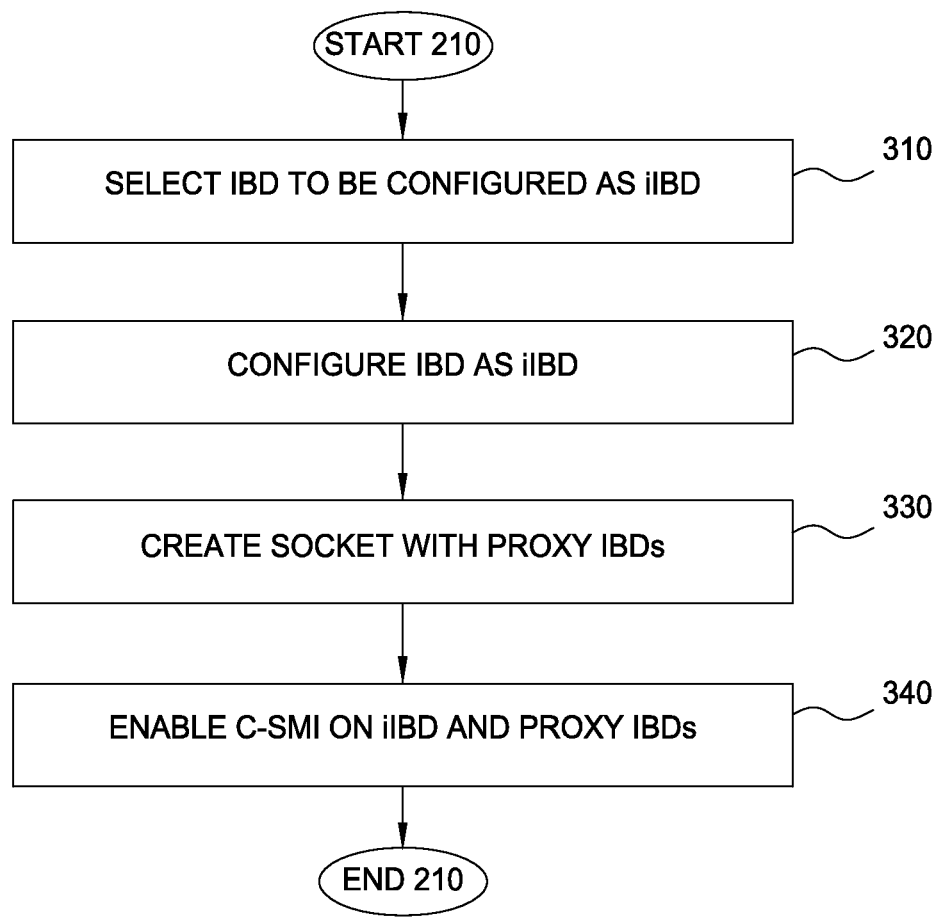
FIG. 3 illustrates a method to create and initialize an intelligent IBD server, according to one embodiment.

FIG. 3 illustrates a method 300 performed to create and initialize an intelligent IBD server, according to one embodiment. Method 300 further details actions performed as part of block 210 of method 200. Generally, method 300 configures and initializes a server as an intelligent IBD server. As noted, the iIBD server may manage remote IBCs residing on different enterprise campus networks across a WAN/MAN. At block 310, a user selects an existing IBD from a campus to be configured as an iIBD. At block 320, the user configures the IBD as an iIBD by entering IP addresses for the proxy IBDs, and specifying the role (such as iIBD, proxy IBD) of each endpoint of the tunnels created between the iIBD and proxy IBDs. At block 330, a socket is created between the iIBD and each proxy IBD using the IP addresses entered at block 320. At block 340, a smart install (or plug-and-play) protocol, such as the Cisco smart install protocol, is enabled on the iIBD and the proxy IBDs. By configuring the iIBD and the proxy IBDs to run the smart install protocol, the proxy IBDs can gather the information of the IBCs in its local network, and periodically share the information with the iIBD over the established tunnel. In doing so, users can monitor an entire enterprise network from a single iIBD.

Figure 4:
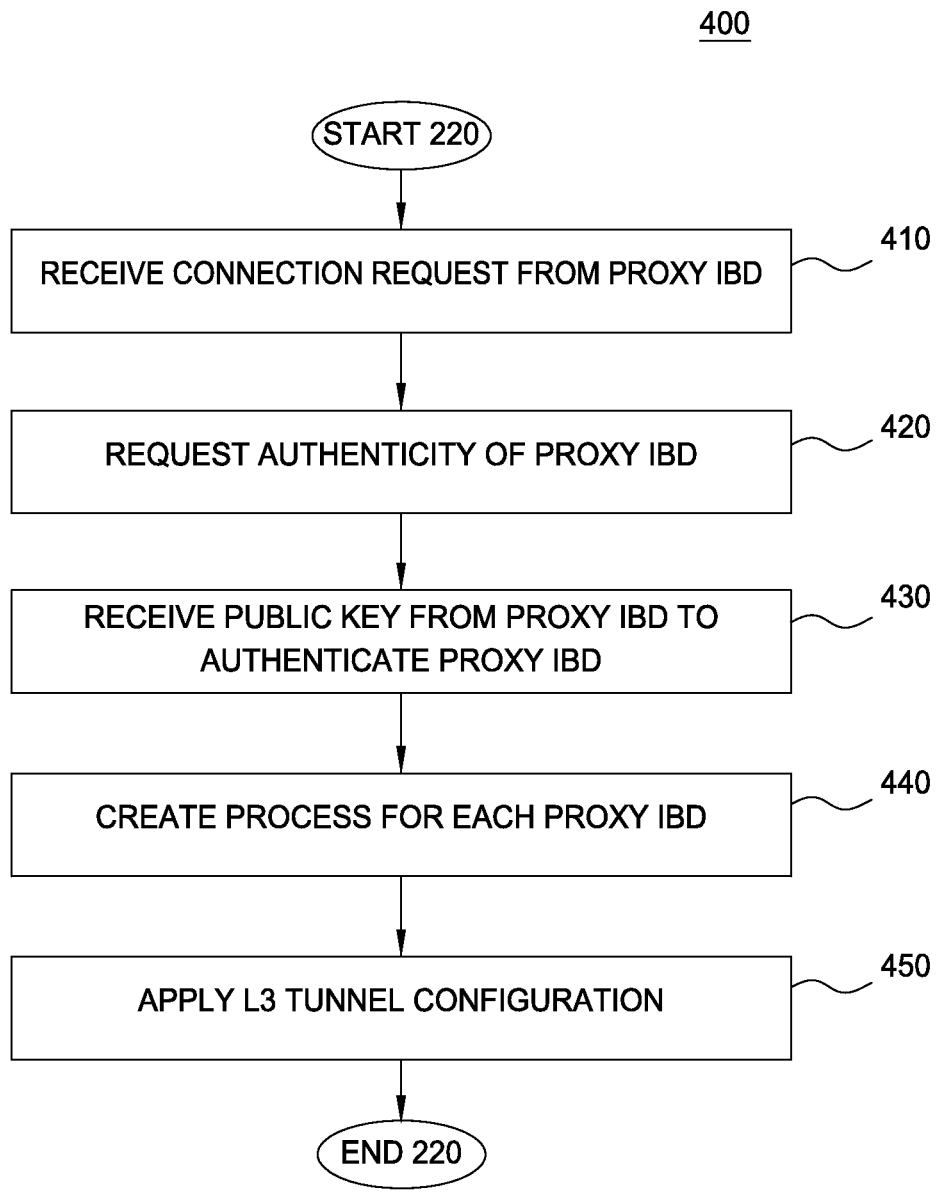
FIG. 4 illustrates a method to register IBD proxy servers with an intelligent IBD server, according to one embodiment.

FIG. 4 illustrates a method 400 performed to register IBD proxy servers with an intelligent IBD server, according to one embodiment. Method 400 further details actions performed as part of block 220 of method 200. Generally, executing method 400 authenticates connections between the iIBD and each of the proxy IBDs. The iIBD and proxy IBDs may communicate through the socket infrastructure generated at block 210. At block 410, the iIBD receives a request from a proxy IBD to establish a TCP/UDP connection using a socket API in a periodic manner until the proxy IBD establishes the connection with an iIBD. If the connection is successfully established, at block 420, the iIBD requests the authenticity of the proxy IBD to avoid security threats. At block 430, the iIBD receives a public key transmitted by the proxy IBD as part of the authentication process. In response, the proxy iIBD sends the proxy IBD an IP address using the C-SMI protocol, which is used to create an IP tunnel between the proxy IBD and the iIBD. At block 440, the iIBD server creates a process for each authenticated proxy IBD. In doing so, whenever the iIBD receives a message from a proxy IBD, the message is handed over to the corresponding process running on the iIBD. At block 450, the L3 GRE tunnel is created between iIBD and the proxy IBDs. This tunnel is used to exchange the Centralized Smart Install Protocol messages between IBD Proxy and iIBD in secured manner. In embodiments where TCP is used for communication between the iIBD and IBD, Table I illustrates an example process to register a proxy IBD with an iIBD server:

TABLE I

| iIBD | Proxy IBD |
|---|---|
| Config (config)# vstack iibd | Config(config) #vsatck iibd-proxy |
| Config (config)# csmi enable | Config(config) # vsatck iibd-ip <ip-address> |
| Receives the connection request and creates an individual process. | Establishes the connection. |
| Request for the authenticity | Sends encryption key by using some public key mechanism |
| Validates the authenticity and provides an IP address to the IBD proxy through CSMI protocol | Receives the CSMI packet, and assigns IP address for the receiving port. Requests for the creating tunnel |
| Applies the tunnel configuration to the iIBD interface and sends the tunnel config to IBD-Proxy | Applies received configuration at IBD-Proxy interface. |

Figure 5:
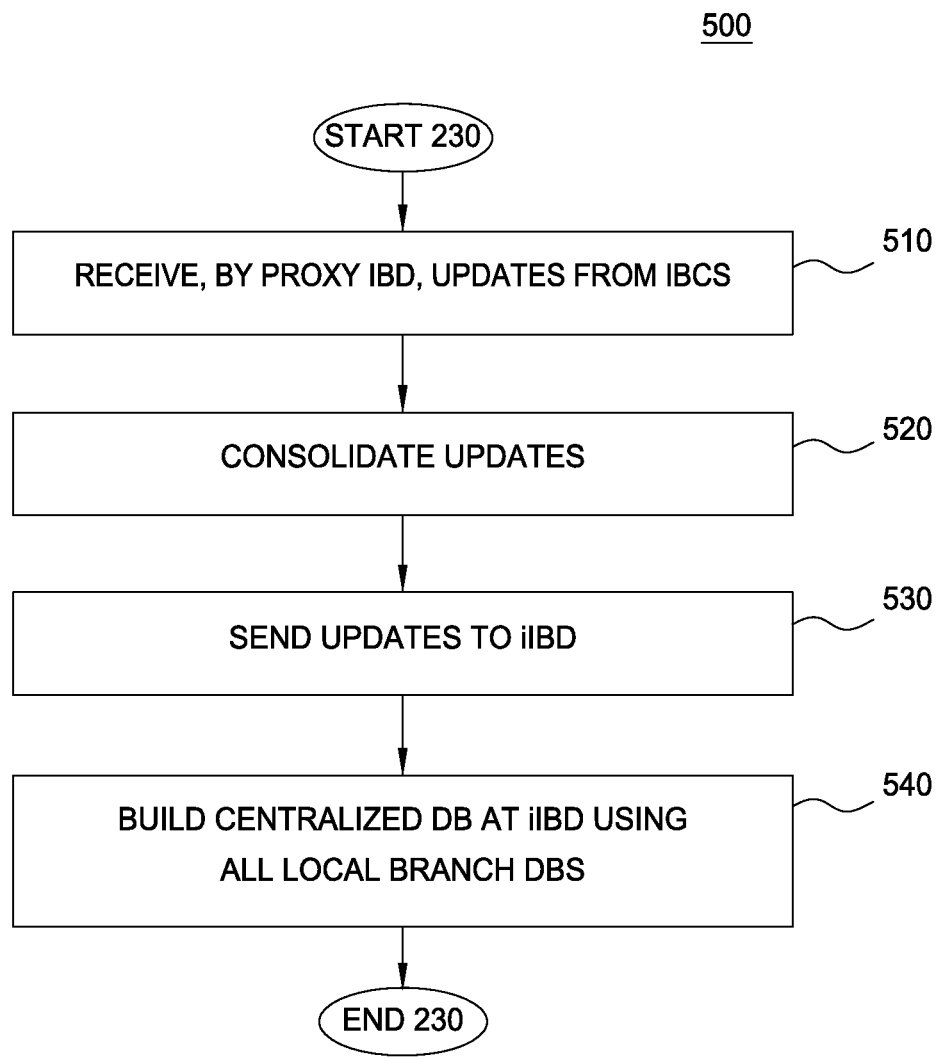
FIG. 5 illustrates a method to build a centralized SMI database at an intelligent IBD server, according to one embodiment.

FIG. 5 illustrates a method 500 performed to build a centralized SMI database at an intelligent IBD server (iIBD), according to one embodiment. Method 500 further details actions performed as part of block 230 of method 200. Generally, method 500 allows the iIBD server to receive updates from one or more proxy IBDs and generate a centralized database of enterprise-wide network elements. At block 510, the proxy IBDs receive updates from IBCs in their network. Examples of updates include discovery protocol neighbor information of each IBC, which are transferred using the smart install protocol. In one embodiment, the discovery protocol is the Cisco Discovery Protocol (CDP). At block 520, each proxy IBD builds a local branch database reflecting the network branch topology from the perspective of the proxy IBD. At step 530, the proxy IBD sends the local branch database to the iIBD. In one embodiment, the proxy IBDs may send their respective local branch databases according to a predefined timing schedule. At block 540, the iIBD builds a centralized database based on the local branch databases. The centralized database allows the iIBD to act as a centralized point of control for all IBCs in the enterprise network.

Figure 6:
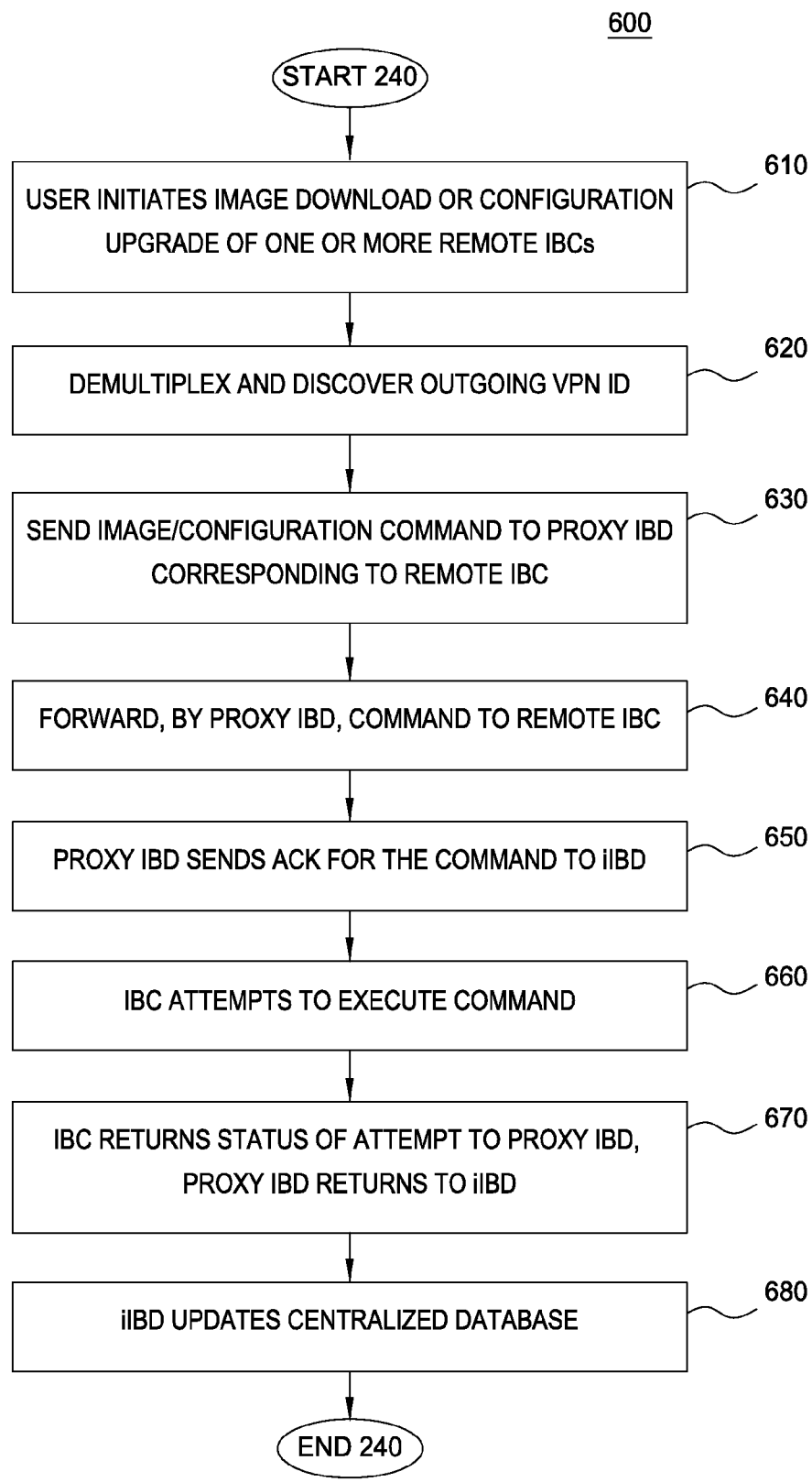
FIG. 6 illustrates a method to issue commands to control or instruct a remote IBC from an intelligent IBD server, according to one embodiment.

FIG. 6 illustrates a method 600 performed to issue commands to manage a remote IBC from an intelligent IBD server, according to one embodiment. Method 400 further details actions performed as part of block 240 of method 200. At block 610, a user initiates an image download or configuration update of one or more remote IBCs that reside on one or more remote campus networks. At block 620, the iIBD demultiplexes the corresponding proxy IBD information of the IBC specified in the request to discover an outgoing VPN ID for the IBCs. At block 630, the iIBD sends an image or configuration command to the proxy IBDs corresponding to the remote IBCs selected at block 610 by the user. In one embodiment, the commands are transferred by the established L3 tunnels. At block 640, the proxy IBD forwards the command to the remote IBC by initiating a corresponding smart install command. At block 650, the proxy IBD sends an ACK for the command to the iIBD, acknowledging that it received and forwarded the command. At block 660, the IBCs attempt to execute the command, i.e., the image install or configuration upgrade is commenced. The proxy IBD may store the image or configuration files, or the proxy IBD may receive the files from the iIBD. In either case, the proxy IBD sends the appropriate files to the IBC such that it may attempt to perform the installation. At block 670, the IBC returns the status of its attempt to perform the installation to the proxy IBD. The proxy IBD in turn forwards the status to the iIBD. For example, the IBC may indicate that the installation was completed successfully, or that the installation was not completed successfully. At block 680, the iIBD updates its centralized database to reflect the status of the attempted command.

Figure 7:
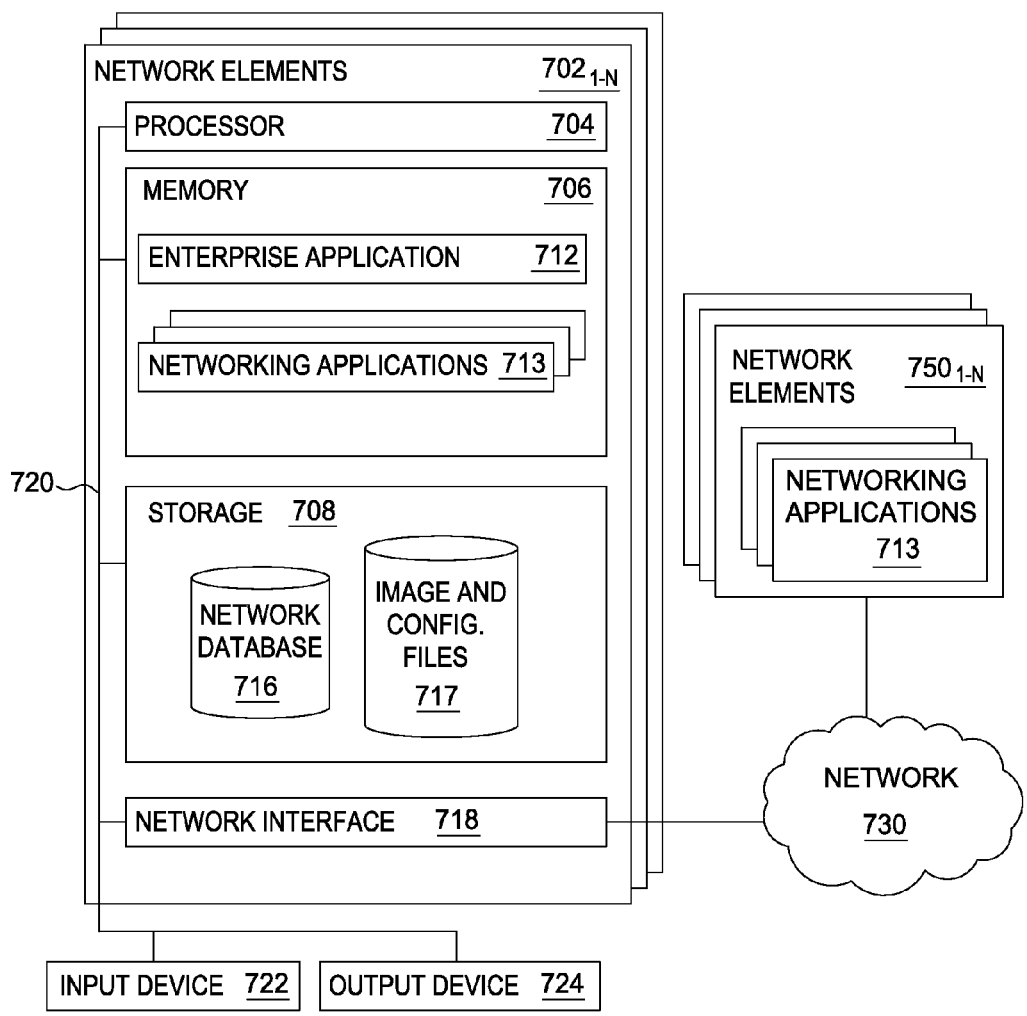
FIG. 7 illustrates a system to enable centralized enterprise image upgrade for distributed campus networks, according to one embodiment.

FIG. 7 illustrates a system 700 which enables centralized enterprise image upgrades for distributed campus networks, according to one embodiment. As shown, network elements $702_{1-N}$ are connected via a network 730 to other network elements $702_{1-N}$ and other network elements $750_{1-N}$. In one embodiment, the network elements $702_{1-N}$ comprise an intelligent IBD (also referred to as a primary IBD or coordinating IBD) and proxy IBDs, while the network elements $750_{1-N}$ comprise IBCs. The iIBD, proxy IBDs, and IBCs may be distributed across a WAN/MAN, with each of two or more campus networks in a distributed enterprise network including an IBD (either the iIBD or one of the proxy IBDs) that serves as an edge switch to its local network of IBCs $750_{1-N}$. In general, the network 730 may be a telecommunications network and/or a wide area network (WAN) or a metropolitan area network (MAN). In a particular embodiment, the network 730 is the Internet.

Each network element $702_{1-N}$ has a processor 704 connected via a bus 720 to a memory 706, and a network interface device 718. The network elements $702_{1-N}$ are configured to execute containerized software applications. The network elements $702_{1-N}$ are generally under the control of an operating system (not shown). Examples of operating systems include the UNIX® operating system, distributions of the Linux® operating system, and the IOS operating system by Cisco Systems®. The processor 704 is included to be representative of a single CPU, multiple CPUs, a single CPU having multiple processing cores, and the like. The processor 704 may execute software developed for the purposes of embodiments disclosed herein. Similarly, the memory 706 may be a random access memory. While the memory 706 is shown as a single identity, it should be understood that the memory 706 may comprise a plurality of modules, and that the memory 706 may exist at multiple levels, from high speed registers and caches to lower speed but larger DRAM chips. The network interface device 718 may be any type of network communications device allowing the network elements $702_{1-N}$ to communicate with other network elements $702_{1-N}$ and other devices via the network 730.

As shown, the memory 706 contains the enterprise application 712, which is an application generally configured to manage remote network elements $750_{1-N}$ from a single point of control, namely one of the network elements $702_{1-N}$ selected to serve as the centralized controller. In one embodiment, the centralized controller is an intelligent IBD (iIBD), which uses the enterprise application 712 to configure connections with one or more proxy IBDs. Through these connections, the iIBD can send commands to upgrade images or configurations of IBCs to the proxy IBDs, which are forwarded to the selected IBCs $750_{1-N}$ by the respective proxy IBDs. The iIBD and proxy IBDs each execute the enterprise application 712. The enterprise application 712 is further configured to manage network topology updates. For example, the proxy IBDs may use the enterprise application 712, or one of the networking applications 713, to transmit network topology updates received from the IBCs $750_{1-N}$ to the iIBD. The iIBD may then store the topology information for each branch of the enterprise network in the network database 716, creating a centralized database including topology information for each remote switch or network element in the enterprise network. The enterprise application 712 therefore provides plug-and-play capabilities for all network elements (IBCs) $750_{1-N}$, even though the IBCs $750_{1-N}$ may be distributed across multiple, geographically remote, and distinct branch networks of the enterprise network. In addition, in at least some embodiments, the iIBD facilitates on-demand or scheduled image upgrades and configuration changes to one or more proxy IBDs. The networking applications 713 may be a suite of applications that control the core functionality of the network elements $702_{1-N}$ and $750_{1-N}$. For example, the networking applications 713 may include, but are not limited to, routing engines, a routing information base (RIB), smart install applications/interfaces, discovery protocols, and the like.

As shown, the storage 708 includes a network database 716, which includes detailed information about the network elements $702_{1-N}$ and $750_{1-N}$. In embodiments where the network database 716 resides on the iIBD, it includes enterprise-wide network topology information, i.e., the network topology information of all network elements in each branch of the enterprise network. In some embodiments, the proxy IBDs may include a network database 716 which reflects the local network topology from the perspective of that proxy IBD's IBCs and other network elements. The proxy IBDs are configured to receive network topology updates from their IBCs, and send the updates to the iIBD, where the updates may be reflected in the centralized network database 716 of the iIBD. The storage 708 also includes image and configuration files 717, which provides a repository configured to store system image files used to flash the network elements $750_{1-N}$ and configuration files used to modify the configuration of the network elements $750_{1-N}$. Each IBD (whether functioning as an iIBD or proxy IBD) may transfer the appropriate files to the IBCs in their respective network in order to facilitate the upgrades to the IBCs.

Advantageously, embodiments disclosed herein provide a single point of control for network elements in an enterprise network distributed across multiple geographic sites through a WAN/MAN. More specifically, users can flash images and modify configuration of network elements though the single point of control, regardless of the geographic location of each network element. By providing the single point of control, which in one embodiment is an intelligent IBD, the management cost for an enterprise is reduced from N to 1, where N is the number of distinct campuses/branches of the enterprise network (each traditionally managed by its own respective point of control). Embodiments disclosed herein therefore support a plug-and-play feature for all network elements present in the enterprise, as users need not waste time configuring each network element through multiple points of control.

Additionally, embodiments described herein support scheduled and on-demand image and configuration upgrades. For example, a network administrator may schedule an image upgrade or configuration update that periodically executes according to a predefined timing interval. The scheduled upgrade may affect any number or groups of network elements across any of the campus networks in the enterprise network. Furthermore, the entire cluster may be upgraded with one command by clustering the network elements from different campuses, and issuing commands to upgrade the entire cluster at once. Different hardware may be upgraded with their respective configuration or system image files, which may be identified by the product version string of each type of hardware.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications, such as the enterprise application, or related data available in the cloud. For example, the enterprise application could execute on a computing system in the cloud and manage remote networking devices on different campuses of an enterprise network. In such a case, the enterprise application could receive information regarding the networking devices in the enterprise network, and store a centralized database for all networking devices in the enterprise network at a storage location in the cloud. Doing so allows a user to access this information from any computing system attached to a network connected to the cloud (e.g., the Internet).

As will be appreciated by one skilled in the art, embodiments may be embodied as a system, method or computer program product. Accordingly, aspects may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
creating a layer 3 (L3) tunneled connection between a primary intermediate branch director (IBD) in a first branch of an enterprise network and a first proxy IBD in a second branch of the enterprise network, wherein the first and second branches of the enterprise network comprise distinct local networks connected by the L3 tunneled connection over a wide area network (WAN), wherein the primary IBD and the proxy IBD are network devices comprising one of a network router and a network switch;
enabling a smart install protocol on the L3 tunneled connection;
receiving, at the primary IBD from the first proxy IBD through the L3 tunneled connection based on the smart install protocol, network topology information for each of a plurality of intermediate branch clients (IBCs) in the second branch of the enterprise network, wherein the IBCs comprise network switches, wherein the network topology information specifies a connection between a first IBC and a second IBC of the plurality of IBCs in the second branch of the enterprise network;
receiving a request to configure the first IBC in the second branch of the enterprise network;
referencing the network topology information to determine that the first proxy IBD is a proxy for the first IBC;
determining, by the primary IBD, an outgoing virtual private network (VPN) ID of the first proxy IBD; and
issuing, by the primary IBD based on the determined VPN ID and to the first proxy IBD through the L3 tunneled connection, a command based on the smart install protocol to remotely configure the first IBC in the second branch of the enterprise network.

2. The method of claim 1, wherein each branch of the enterprise network comprises a respective proxy IBD, wherein the first branch of the enterprise network comprises a plurality of IBCs, wherein the primary IBD comprises an edge switch providing links to the WAN for each of the plurality of IBCs in the first branch of the enterprise network, wherein the first proxy IBD comprises an edge switch providing links to the WAN for each of the plurality of IBCs in the second branch of the enterprise network, the method further comprising:

prior to creating the connection, configuring a second proxy IBD as the primary IBD, wherein configuring the second proxy IBD as the primary IBD comprises:
detecting, by the second proxy IBD using at least one discovery protocol, each proxy IBD in the enterprise network;
entering, at the second proxy IBD, an IP address and a respective role of each proxy IBD in the enterprise network; and
creating a respective network socket between the second proxy IBD and each proxy IBD in the enterprise network.

3. The method of claim 2, wherein the smart install protocol comprises a plug and play configuration and image-management protocol, wherein creating the L3 tunneled connection comprises:
receiving, by the primary IBD through the network socket between the primary IBD and the first proxy IBD, a request to create a transmission control protocol (TCP) connection;
creating the TCP connection between the primary IBD and the first proxy IBD;
authenticating the first proxy IBD by receiving, by the primary IBD, a public key from the first proxy IBD; and
creating an L3 tunnel between the primary IBD and the first proxy IBD; and
enabling the plug and play configuration and image-management protocol on the L3 tunneled connection.

4. The method of claim 3, wherein the primary IBD maintains a centralized database including network topology information for each branch of the enterprise network including the first and second branches of the enterprise network, wherein the primary IBD receives network topology information from the plurality of IBCs in the first branch of the enterprise network, wherein the first proxy IBD receives network topology information from the plurality of IBCs in the second branch of the enterprise network, wherein the network topology information comprises neighbor discovery information gathered using at least one discovery protocol.

5. The method of claim 4, wherein the first IBC is replaced by a second IBC, of the plurality of IBCs, wherein the issued command remotely configures the second IBC by installing a system image file and a configuration file on the second IBC.

6. The method of claim 4, wherein the command specifies to update a system image file and a configuration file of the first IBC.

7. The method of claim 4, further comprising:
receiving, by the first proxy IBD, one or more network topology updates from a subset of the plurality of IBCs, wherein the one or more network topology updates comprise neighbor discovery information gathered using at least one discovery protocol; and
receiving, by the primary IBD, the network topology updates received from the subset of the plurality of IBCs.

8. The method of claim 4, wherein issuing the command comprises:
transmitting, by the primary IBD, the command to the first proxy IBD;
forwarding, by the first proxy IBD, the command to the first IBC of the plurality of IBCs;
receiving, by the first proxy IBD, a message from the first IBC indicating whether the command was executed successfully;

forwarding, by the first proxy IBD, the message to the primary IBD; and updating, by the primary IBD, the network topology information of the second branch of the enterprise network.

9. A computer program product, comprising:
a non-transitory computer-readable storage medium having computer-readable program code embodied therewith which when executed by a processor performs an operation comprising:
   creating a layer 3 (L3) tunneled connection between a primary intermediate branch director (IBD) in a first branch of an enterprise network and a first proxy IBD in a second branch of the enterprise network, wherein the first and second branches of the enterprise network comprise distinct local networks connected by the L3 tunneled connection over a wide area network (WAN), wherein the primary IBD and the proxy IBD are network devices comprising one of a network router and a network switch;
   enabling a smart install protocol on the L3 tunneled connection;
   receiving, at the primary IBD from the first proxy IBD through the L3 tunneled connection based on the smart install protocol, network topology information for each of a plurality of intermediate branch clients (IBCs) in the second branch of the enterprise network, wherein the IBCs comprise network switches, wherein the network topology information specifies a connection between a first IBC and a second IBC of the plurality of IBCs in the second branch of the enterprise network;
   receiving a request to configure the first IBC in the second branch of the enterprise network;
   referencing the network topology information to determine that the first proxy IBD is a proxy for the first IBC;
   determining, by the primary IBD, an outgoing virtual private network (VPN) ID of the first proxy IBD; and
   issuing, by the primary IBD based on the determined VPN ID and to the first proxy IBD through the L3 tunneled connection, a command based on the smart install protocol to remotely configure the first IBC in the second branch of the enterprise network.

10. The computer program product of claim 9, wherein each branch of the enterprise network comprises a respective proxy IBD, wherein the first branch of the enterprise network comprises a plurality of IBCs, wherein the primary IBD comprises an edge switch providing links to the WAN for each of the plurality of IBCs in the first branch of the enterprise network, wherein the first proxy IBD comprises an edge switch providing links to the WAN for each of the plurality of IBCs in the second branch of the enterprise network, the operation further comprising:
   prior to creating the connection, configuring a second proxy IBD as the primary IBD, wherein configuring the second proxy IBD as the primary IBD comprises:
      detecting, by the second proxy IBD using at least one discovery protocol, each proxy IBD in the enterprise network;
      entering, at the second proxy IBD, an IP address and a respective role of each proxy IBD in the enterprise network; and
      creating a respective network socket between the second proxy IBD and each proxy IBD in the enterprise network.

11. The computer program product of claim 10, wherein the smart install protocol comprises a plug and play configuration and image-management protocol, wherein creating the L3 tunneled connection comprises:
   receiving, by the primary IBD through the network socket between the primary IBD and the first proxy IBD, a request to create a transmission control protocol (TCP) connection;
   creating the TCP connection between the primary IBD and the first proxy IBD;
   authenticating the first proxy IBD by receiving, by the primary IBD, a public key from the first proxy IBD; and
   creating an L3 tunnel between the primary IBD and the first proxy IBD; and
   enabling the plug and play configuration and image-management protocol on the L3 tunneled connection.

12. The computer program product of claim 11, wherein the primary IBD maintains a centralized database including network topology information for each branch of the enterprise network including the first and second branches of the enterprise network, wherein the primary IBD receives network topology information from the plurality of IBCs in the first branch of the enterprise network, wherein the first proxy IBD receives network topology information from the plurality of IBCs in the second branch of the enterprise network, wherein the network topology information comprises neighbor discovery information gathered using at least one discovery protocol.

13. The computer program product of claim 12, wherein the first IBC is replaced by a second IBC, of the plurality of IBCs, wherein the issued command remotely configures the second IBC by installing a system image file and a configuration file on the second IBC.

14. The computer program product of claim 12, wherein the command specifies to update a system image file and a configuration file of the first IBC.

15. The computer program product of claim 12, the operation further comprising:
   receiving, by the first proxy IBD, one or more network topology updates from a subset of the plurality of IBCs, wherein the one or more network topology updates comprise neighbor discovery information gathered using at least one discovery protocol; and
   receiving, by the primary IBD, the network topology updates received from the subset of the plurality of IBCs.

16. The computer program product of claim 12, wherein issuing the command comprises:
   determining, by the primary IBD, an outgoing virtual private network (VPN) ID of the first proxy IBD;
   transmitting, by the primary IBD, the command to the first proxy IBD;
   forwarding, by the first proxy IBD, the command to the first IBC of the plurality of IBCs;
   receiving, by the first proxy IBD, a message from the first IBC indicating whether the command was executed successfully;
   forwarding, by the first proxy IBD, the message to the primary IBD; and
   updating, by the primary IBD, the network topology information of the second branch of the enterprise network.

17. A system, comprising:
one or more computer processors; and
a memory containing a program which when executed by the one or more computer processors performs an operation, the operation comprising:
creating a layer 3 (L3) tunneled connection between a primary intermediate branch director (IBD) in a first branch of an enterprise network and a first proxy IBD in a second branch of the enterprise network, wherein the first and second branches of the enterprise network comprise distinct local networks connected by the L3 tunneled connection over a wide area network (WAN), wherein the primary IBD and the proxy IBD are network devices comprising one of a network router and a network switch;
enabling a smart install protocol on the L3 tunneled connection;
receiving, at the primary IBD from the first proxy IBD through the L3 tunneled connection based on the smart install protocol, network topology information for each of a plurality of intermediate branch clients (IBCs) in the second branch of the enterprise network, wherein the IBCs comprise network switches, wherein the network topology information specifies a connection between a first IBC and a second IBC of the plurality of IBCs in the second branch of the enterprise network;
receiving a request to configure the first IBC in the second branch of the enterprise network;
referencing the network topology information to determine that the first proxy IBD is a proxy for the first IBC;
determining, by the primary IBD, an outgoing virtual private network (VPN) ID of the first proxy IBD; and
issuing, by the primary IBD based on the determined VPN ID and to the first proxy IBD through the L3 tunneled connection, a command based on the smart install protocol to remotely configure the first IBC in the second branch of the enterprise network.

18. The system of claim 17, wherein each branch of the enterprise network comprises a respective proxy IBD, wherein the first branch of the enterprise network comprises a plurality of IBCs, wherein the primary IBD comprises an edge switch providing links to the WAN for each of the plurality of IBCs in the first branch of the enterprise network, wherein the first proxy IBD comprises an edge switch providing links to the WAN for each of the plurality of IBCs in the second branch of the enterprise network, the operation further comprising:
prior to creating the connection, configuring a second proxy IBD as the primary IBD, wherein configuring the second proxy IBD as the primary IBD comprises:
detecting, by the second proxy IBD using at least one discovery protocol, each proxy IBD in the enterprise network;
entering, at the second proxy IBD, an IP address and a respective role of each proxy IBD in the enterprise network; and
creating a respective network socket between the second proxy IBD and each proxy IBD in the enterprise network.

19. The system of claim 18, wherein the smart install protocol comprises a plug and play configuration and image-management protocol, wherein creating the L3 tunneled connection comprises:
receiving, by the primary IBD through the network socket between the primary IBD and the first proxy IBD, a request to create a transmission control protocol (TCP) connection;
creating the TCP connection between the primary IBD and the first proxy IBD;
authenticating the first proxy IBD by receiving, by the primary IBD, a public key from the first proxy IBD; and
creating an L3 tunnel between the primary IBD and the first proxy IBD; and
enabling the plug and play configuration and image-management protocol on the L3 tunneled connection.

20. The system of claim 19, wherein the primary IBD maintains a centralized database including network topology information for each branch of the enterprise network including the first and second branches of the enterprise network, wherein the primary IBD receives network topology information from the plurality of IBCs in the first branch of the enterprise network, wherein the first proxy IBD receives network topology information from the plurality of IBCs in the second branch of the enterprise network, wherein the network topology information comprises neighbor discovery information gathered using at least one discovery protocol.

21. The system of claim 20, wherein the first IBC is replaced by a second IBC, of the plurality of IBCs, wherein the issued command remotely configures the second IBC by installing a system image file and a configuration file on the second IBC.

22. The system of claim 20, wherein the command specifies to update a system image file and a configuration file of the first IBC.

23. The system of claim 20, the operation further comprising:
receiving, by the first proxy IBD, one or more network topology updates from a subset of the plurality of IBCs, wherein the one or more network topology updates comprise neighbor discovery information gathered using at least one discovery protocol; and
receiving, by the primary IBD, the network topology updates received from the subset of the plurality of IBCs.

24. The system of claim 20, wherein issuing the command comprises:
determining, by the primary IBD, an outgoing virtual private network (VPN) ID of the first proxy IBD;
transmitting, by the primary IBD, the command to the first proxy IBD;
forwarding, by the first proxy IBD, the command to the first IBC of the plurality of IBCs;
receiving, by the first proxy IBD, a message from the first IBC indicating whether the command was executed successfully;
forwarding, by the first proxy IBD, the message to the primary IBD; and
updating, by the primary IBD, the network topology information of the second branch of the enterprise network.

* * * * *